June 13, 1939. E. WIRZ Re. 21,116

TRANSFORMER

Original Filed Nov. 10, 1931 2 Sheets-Sheet 1

INVENTOR.

Emil Wirz

BY

Watson, Bristol, Johnson & Leavenworth

ATTORNEYS.

TRANSFORMER

Original Filed Nov. 10, 1931 2 Sheets-Sheet 2

INVENTOR.

Emil Wirz

BY Watson, Bristol, Johnson & Leavenworth
ATTORNEYS.

Reissued June 13, 1939 Re. 21,116

UNITED STATES PATENT OFFICE 21,116

TRANSFORMER

Emil Wirz, Biel, Switzerland

Original No. 2,047,845, dated July 14, 1936, Serial No. 574,121, November 10, 1931. Application for reissue June 28, 1938, Serial No. 216,352. In Switzerland March 17, 1931

7 Claims. (Cl. 171—119)

My invention relates to a new and improved method of operating a transformer, and it also relates to a new and improved transformer.

One of the objects of my invention is to automatically limit the magnetic flux which passes through the secondary coil of a transformer in order to automatically limit the current and/or voltage which is induced in the secondary coil of the transformer. This prevents the voltage and/or current in the secondary coil from increasing beyond the danger limit, so that the secondary circuit is prevented from being overloaded without the use of automatic safety devices, such as fuses, circuit-breakers, and the secondary coil is therefore protected from burning out due to excessive current.

Another object of my invention is to automatically deflect the magnetic flux of the transformer from the secondary coil, as the secondary current increases.

Another object of my invention is to produce a magnetic leakage between the primary and secondary coils of the transformer, said leakage increasing when the secondary current increases, so that the secondary current and/or voltage cannot increase beyond a determined limit.

Other objects of my invention will be set forth in the following description and drawings which illustrate a preferred embodiment thereof, it being understood that the above general statement of the objects of my invention is intended to generally explain the same and not to limit it in any manner.

Figure 1:
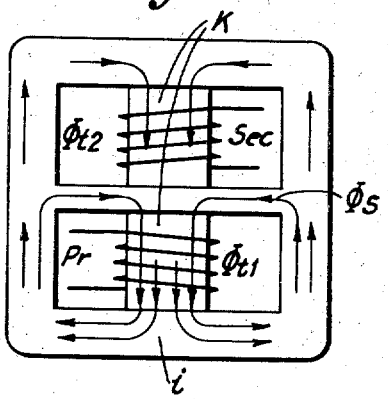
Fig. 1 is a diagrammatic elevation illustrating my invention applied to a shell-type transformer, and it illustrates the path of the magnetic leakage, the coils, and the path of the magnetic flux when the laminations for securing the magnetic leakage are arranged at the outer faces of the iron core and the yokes.
Figure 4:
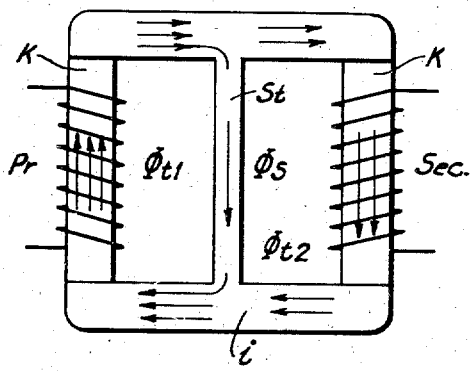
Fig. 4 is a diagrammatic elevation of a core-type transformer, having a leakage path between the core and the laminations for providing the leakage path, when said laminations are at the outer faces of the yokes. In this figure the laminations for providing the leakage path, and which may be referred to as the "leakage laminations" are located at the outer faces of the yokes.

The shell-type transformer which is designated in the drawings consists of the core *k* which has the same cross-section for the primary and secondary coils. The transformer also has the yokes *i* which are made of stamped or cut transformer laminations *b*. Two coils are arranged upon the iron core proper in such manner as to have the primary coil *Pr* on one side, and the secondary coil *Sec* on the other side. Stamped or cut laminations for the leakage path *St* are arranged perpendicular to the core, and these leakage laminations are located above and below (at the outer faces of) the yokes and the core.

If an alternating voltage is imposed upon the primary coil, this produces an alternating flux $\phi t$, and this primary flux is mainly linked with the part of the iron core which is associated with the secondary coil and with the yokes. Hence this creates a small leakage flux under even a condition of no-load through the leakage path *St*, and this leakage flux corresponds to the cross-section of the leakage path.

If the secondary coil is loaded up to a condition of short-circuit, the current flow through the secondary coil forces a portion of the primary flux into the magnetic circuit of the leakage path so that the proportion of the magnetic flux $\phi t2$ in the secondary coil, with relation to the leakage flux $\phi s$ is in inverse proportion to the reluctance of both of these by-paths, and the number of ampere-turns is the same in both circuits. Hence the secondary current can also increase until a stable or non-changing condition is reached. Hence by a suitable choice of the cross-section of the leakage path and of the path of the magnetic flux, as well as by arranging the leakage laminations above, below and between the core and the yokes, any desired limit of the amount of the secondary current can be secured when the secondary circuit is short-circuited. In this arrangement the yokes can also be simultaneously enlarged or reinforced, according to the arrangement of the leakage laminations, so that the no-load current and the no-load loss are decreased, which is a very important advantage in the use of small transformers.

Figure 7:
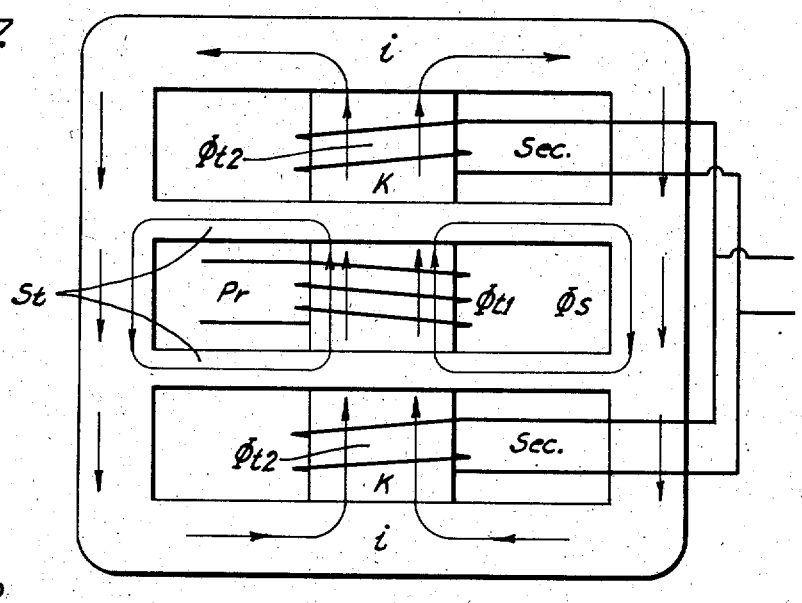
Fig. 7 is a diagrammatic elevation of a shell-type transformer having a divided or split secondary coil and a plurality of leakage paths, when the leakage laminations are either entirely at the outer faces of the core of the yokes, or when the leakage laminations are partially between the core and the yokes and partially at the outer faces of the core and the yokes.

This arrangement of the leakage path, in order to reduce the short-circuit current, can be practically utilized in all transformers of the shell-type of any capacity. However, when the capacity of the transformer increases, it is necessary to divide the coils, so that a pair of leakage paths, or a plurality of pairs of leakage paths must be correspondingly provided, as shown in Fig. 7.

The core-type transformer which is designated consists of a pair of cut or stamped cores *k*, and the side yokes *i*, which are made of transformer laminations *b*. The primary coil *Pr* is located on one iron core, and the secondary coil *Sec* is arranged upon the other core.

In core-type transformers, the leakage laminations can be inserted into the yokes, or said yokes can be provided with leakage lamination projections *V*. Hence the cross-section of the leakage path or core can consist of leakage laminations which are arranged either above or below or between the yokes. In this type of transformer, when the load is increased up to short-circuit, the current flow through the secondary coil also by-passes a part of the primary flux from the secondary coil to the leakage path.

When there is no load upon the transformer, a leakage flux $\phi so$ is produced which depends upon the cross-section of the leakage path, and this leakage flux increases up to a maximum value $\phi s$ when the secondary circuit has its load increased up to a condition of short-circuit so that the current in the secondary circuit under a condition of short-circuit can be reduced to the desired and predetermined magnitude. The magnitude of the maximum secondary current which can be secured is therefore predetermined by a suitable choice of the cross-section of the magnetic leakage path and also by locating the leakage laminations above or below or between the yokes. At the same time the no-load current and the no-load loss of the transformer can be diminished, due to the reinforcement of the yokes which is produced by the leakage lamination projections.

Figure 2:
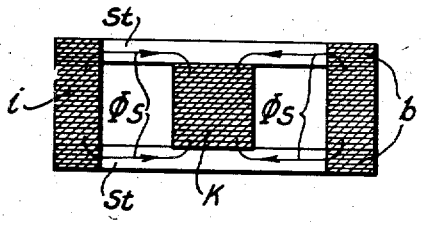
Fig. 2 is a sectional view of Fig. 1, showing the core, the yokes, and laminations for providing the leakage path of a shell-type transformer, when the leakage path is at the outer faces of the iron core and the yokes. This view is taken in a median horizontal plane of Fig. 1, and is partially in elevation.
Figure 5:
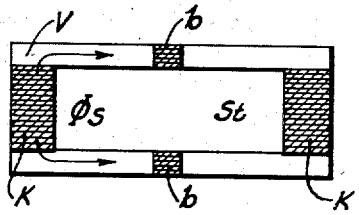
Fig. 5 is a cross-section of the core and the yokes, and the leakage laminations of the core-type transformer, when the leakage laminations are located only at the outer faces of the yokes. This is also a horizontal sectional view, partially in elevation.
Figure 8:
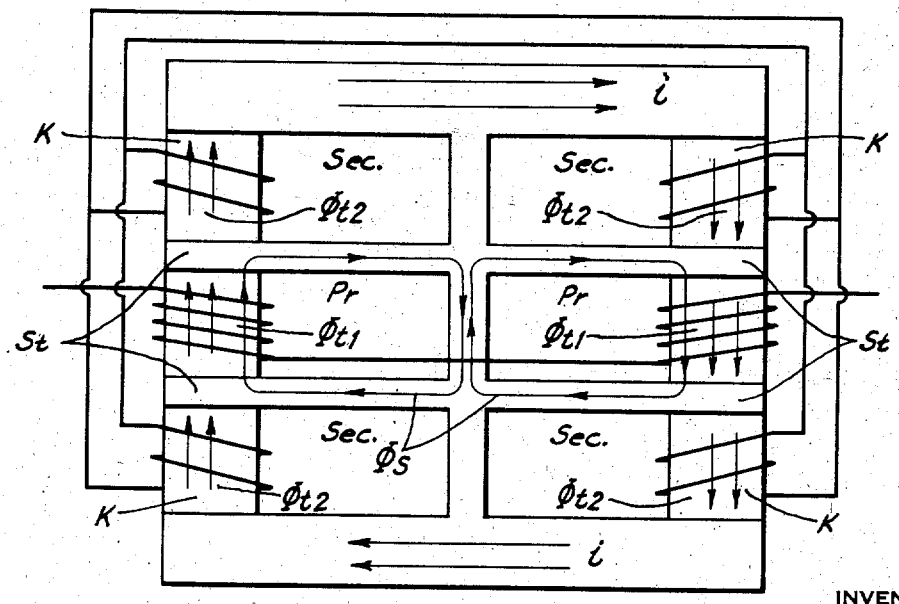
Fig. 8 is a diagrammatic elevation of a core-type transformer having divided coils and corresponding leakage paths, when the leakage laminations are either between the yokes, or located at the outer faces of the yokes.

This arrangement of the leakage paths for the reduction of the secondary current under a condition of short-circuit can be practically used in all core-type transformers of any capacity. However, in case of increased capacity a division of the coils in the manner shown in Fig. 8 is necessary, and this also produces a division of the leakage paths. Referring to Fig. 2, it can be seen that the leakage path extends through members which are laterally located behind the core and also in front of the core. Said leakage path members can be considered as constituting lateral enlargements of the core. Likewise, the leakage path extends through members which are laterally located in front of the yokes and also behind the yokes, thus constituting in effect lateral enlargements of the yokes. These leakage path members are located above and below the iron core and the yokes.

The principle of operation of the device is as follows:—

Assuming that the secondary current can be suddenly increased due to the formation of a short circuit, this causes a correspondingly rapid increase in the flux which is produced by the secondary current in the secondary coil (or coils). This sharp increase in the magnetic flux which is linked with the secondary coil, tends to repel the passage of the primary flux through the secondary coil, so that the primary coil will be by-passed through the leaking means, which constitute a leakage path.

Figure 3:
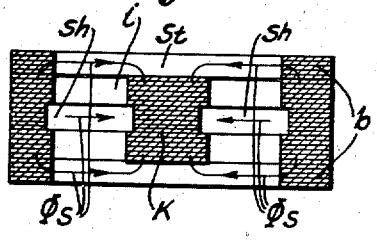
Fig. 3 is a similar section of the core, the yoke, and the laminations for providing the leakage path of the shell-type transformer, when the laminations for providing the leakage path are partly between the outer faces of the core and the yokes, and partly at the outer faces of the core and the yokes.
Figure 6:
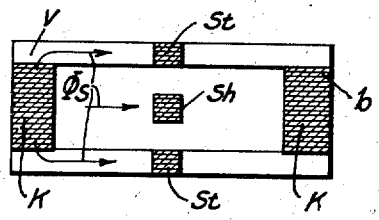
Fig. 6 is a similar cross-section of the core, the yokes and the leakage laminations of the core-type transformer, when the leakage laminations are partly between the yokes, and partly at the outer faces of the yokes.

In Figs. 3 and 6, the leakage means is shown as provided in two places, each being of a different type. One type of means is depicted at *St* and comprises laminations with integral leakage flux bridges added at the outer faces to the core laminations forming enlargements of the yokes *i*, the other being depicted as small magnetic bridges or shunt members *Sh* inserted between the core and yokes, one on each side and disposed at intermediate points between the outer faces of the core and yokes. In order to attain the effect of a leakage path free from any air-gaps and having relatively small reluctances at all points of the path for the latter type as well as for the former, the members *Sh* are mortised into the yokes and/or the core. This imparts additionally the mechanical advantage of insuring against lateral displacement of the members *Sh*. The invention in this form is not to be limited to the use simultaneously of both types of leakage means, the use of the latter type alone being also contemplated.

I have shown a preferred embodiment of my invention, but it is clear that numerous changes and omissions could be made without departing from its spirit.

The improved transformer can be used in alarm systems, in announcement systems, and in rectifiers.

As shown in the drawings, the leakage means are of smaller effective cross section than the permeable means through which the primary flux and the secondary flux pass.

Having described my invention, what I claim as new and desire to secure by Letters Patent is:

1. A transformer having core means and yoke means, a primary coil and a secondary coil located on said core means, and a leakage bridge adapted to bypass only a portion of the main flux of the primary coil, said leakage bridge constituting a fixed enlargement of the yoke means of the transformer, and forming a fixed and wholly closed leakage path which is wholly free from any leakage air gap with relation to said yoke means and said core means, the effective cross section of said leakage bridge being less than the effective cross section of said core means, the leakage bridge having sufficient cross-section to limit the flux through said secondary coil automatically and without the formation of an air-gap, under maximum predetermined load.

2. A transformer having a laminated core means, a primary coil and a secondary coil located on said core means, said core means having additional laminations which form a leakage bridge which is adapted to bypass only a portion of the main flux of the primary coil, said leakage bridge forming a fixed and wholly closed leakage path which is wholly free from any leakage air gap with relation to said core means, the effective cross section of said leakage bridge being less than the effective cross section of said core means, the leakage bridge having sufficient cross-section to limit the flux through said secondary coil automatically and without the formation of an air-gap, under maximum predetermined load.

3. A transformer having a yoke means and laminated core means, a primary coil and a secondary coil located on said core means, said core means having additional laminations which form a leakage bridge which is adapted to bypass only a portion of the main flux of the primary coil, said leakage bridge forming a fixed and wholly closed leakage path which is wholly free from any leakage air gap with relation to said core means, the effective cross section of said leakage bridge being less than the effective cross section of said core means, said leakage bridge constituting a fixed and continuous enlargement of the yoke means of the transformer, the yeakage bridge having sufficient cross-section to limit the flux through said secondary coil automatically and without the formation of an air-gap, under maximum predetermined load.

4. A transformer having a yoke means and laminated core means, a primary coil and a secondary coil located on said core means, said core means having additional laminations which form a leakage bridge which is adapted to bypass only a portion of the main flux of the primary coil, said leakage bridge forming a fixed and closed leakage path which is wholly free from any leakage air gap with relation to said core means, the effective cross section of said leakage bridge being less than the effective cross section of said core means, said leakage bridge constituting a fixed and continuous enlargement of the yoke of the transformer, some of the laminations of the leakage bridge being located between the core means and the yoke means, and some of said laminations of the leakage bridge being located at the outer faces of said core means and of said yoke means, the leakage bridge having sufficient cross-section to limit the flux through said secondary coil automatically and without the formation of an air-gap, under maximum predetermined load.

5. A transformer comprising an iron body of the shell type consisting of assembled laminations providing yokes and an interior core, windings on said core, and leakage control means associated with said iron body and provided in two forms, one of which consists of additional laminations provided with integral leakage bridging members disposed transversely to the core at an intermediate point, said additional laminations providing enlargements of the yokes, said other form consisting of magnetic shunt members inserted between the core and side yokes and having at least one end mortised into place thereby providing tight butt joints of relatively low reluctances and mechanical stability.

6. A transformer having an iron body of the shell type and consisting of assembled laminations providing yokes and an interior core, windings on said core, and leakage control bridging means associated with said iron body and consisting of additional laminations superposed upon the faces of the core laminations and having integral bridging members extending thereacross transversely of the core at an intermediate point.

7. A transformer having an iron body of the shell type and consisting of assembled laminations providing yokes and an interior core, said laminations comprising an interior group having their core and yoke portions notched to provide at least one pair of oppositely disposed recesses, the exterior groups being without such notches, windings on said core, and magnetic leakage control means consisting of magnetic members of lengths greater than the distance from core to a side yoke and of an average cross-section materially less than that of the core tightly inserted in said recesses between a core and an opposite side yoke and having its ends forming a mortised joint with said notched laminations whereby a relatively small magnetic reluctance obtains at the joint and also the mechanical advantage of insuring against lateral displacement in the winding space.

EMIL WIRZ.